(12) United States Patent
Park et al.

(10) Patent No.: US 9,296,870 B2
(45) Date of Patent: Mar. 29, 2016

(54) MODIFICATION OF SURFACES WITH NANOPARTICLES

(75) Inventors: Ellane J. Park, New York, NY (US); Nicholas J. Turro, Tenafly, NJ (US); Jeffrey T. Koberstein, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 838 days.

(21) Appl. No.: 12/844,635

(22) Filed: Jul. 27, 2010

(65) Prior Publication Data

US 2011/0059264 A1   Mar. 10, 2011

Related U.S. Application Data

(60) Provisional application No. 61/228,882, filed on Jul. 27, 2009.

(51) Int. Cl.
*C08J 7/18* (2006.01)
*C09D 1/00* (2006.01)
*C09D 7/12* (2006.01)

(52) U.S. Cl.
CPC ... *C08J 7/18* (2013.01); *C09D 1/00* (2013.01); *C09D 7/1225* (2013.01); *C09D 7/1266* (2013.01); *C08J 2325/06* (2013.01)

(58) Field of Classification Search
CPC ........... C08J 7/18; C09D 1/00; C09D 7/1225; C09D 7/1266
USPC ......................................... 427/487, 504, 510
See application file for complete search history.

(56) References Cited

U.S. PATENT DOCUMENTS 3,711,244 A * 1/1973 Sayigh et al. ................. 430/141
5,304,404 A * 4/1994 Morra et al. .................. 427/512

(Continued)

FOREIGN PATENT DOCUMENTS

WO   WO-2004085305 A2   10/2004
WO   WO-2010/053993     5/2010

OTHER PUBLICATIONS

An et al., "Photopatterned Arrays of Fluorescent Organic Nanoparticles," Angewandte Chemie, International Edition, vol. 46, pp. 1978-1982 (2007).

(Continued)

*Primary Examiner* — Elena T Lightfoot
(74) *Attorney, Agent, or Firm* — Wilmer Cutler Pickering Hale and Dorr LLP (57) ABSTRACT

Methods for functionalizing a surface of a substrate with nanoparticles are described. In certain embodiments, the method can include attaching a plurality of photoactive linker to nanoparticles to obtain photoactive nanoparticles, wherein each photoactive linker comprises a binding group that attaches to the nanoparticles and a photoactive group; depositing the photoactive nanoparticles to the surface of the substrate, wherein the surface of the substrate comprises reactive groups that are capable of reacting with the photoactive groups; and irradiating the photoactive nanoparticles with radiation to react the photoactive group with the reactive group and to functionalize the surface of the substrate with nanoparticles. In certain embodiments, the method can include attaching a plurality of photoactive linker linkers to a surface of a substrate to obtain a photoactive surface, wherein each photoactive linker comprises a photoactive group and a binding group that attaches to the surface of the substrate; depositing nanoparticles to the photoactive surface, wherein the nanoparticles comprise reactive groups that are capable of reacting with the photoactive groups; and irradiating the photoactive surface with radiation to react the photoactive group with the reactive group to functionalize the surface of the substrate with nanoparticles.

30 Claims, 10 Drawing Sheets

(56) References Cited

U.S. PATENT DOCUMENTS

| | | | |
|---|---|---|---|
| 5,624,711 A * | 4/1997 | Sundberg et al. | 506/32 |
| 5,830,952 A | 11/1998 | Pedersen et al. | |
| 6,353,037 B1 | 3/2002 | Thunhorst et al. | |
| 6,372,407 B1 * | 4/2002 | Liu et al. | 430/270.1 |
| 6,667,360 B1 | 12/2003 | Ng et al. | |
| 7,081,234 B1 | 7/2006 | Qi et al. | |
| 7,166,412 B2 * | 1/2007 | Park et al. | 430/270.1 |
| 7,217,457 B2 | 5/2007 | Elaissari et al. | |
| 7,294,449 B1 * | 11/2007 | Gudeman et al. | 430/270.1 |
| 7,399,560 B2 * | 7/2008 | Hirai et al. | 430/5 |
| 2003/0011300 A1 * | 1/2003 | Palanisamy et al. | 313/504 |
| 2005/0136258 A1 | 6/2005 | Nie et al. | |
| 2006/0084278 A1 | 4/2006 | Winter et al. | |
| 2006/0165912 A1 | 7/2006 | Koberstein et al. | |
| 2006/0292777 A1 | 12/2006 | Dunbar | |
| 2007/0134420 A1 | 6/2007 | Koberstein et al. | |
| 2007/0269488 A1 | 11/2007 | Ravi | |
| 2008/0146462 A1 * | 6/2008 | Gupta et al. | 506/32 |
| 2008/0299046 A1 | 12/2008 | White et al. | |

OTHER PUBLICATIONS

O'Reilly et al, "Functionalization of Micelles and Shell Cross-linked Nanoparticles Using Click Chemistry," Chem. Mater. 2005, 17, 5976-5988.

Cattaruzza et al, "Magnetite Nanoparticles Anchored to Crystalline Silicon Surfaces," Chem. Mater. 2005, 17, 3311-3316.

Liang et al, "Covalent Layer-by-Layer Assembly of Conjugated Polymers and CdSe Nanoparticles: Multilayer Structure and Photovoltaic Properties," Adv. Funct. Mater. 16, 542-548 (2006).

Sahiner, "Colloidal nanocomposite hydrogel particles," Colloid and Polymer Science, vol. 285, Issue: 4, pp. 413-421, Jan. 2007.

Shin et al, "Hybrid nanogel for sustainable positive thermosensitive drug release," Journal of Controlled Release vol. 73, Issue: 1 pp. 1-6, (May 18, 2001).

Ravi et al., "Hydrogel Nanocomposite as a synthetic Intra-Ocular Lens Capable of accommodation," Macromolecular Symposia vol. 227 pp. 191-201 Jul. 2005.

Gordon Conference on Adhesion at Colby—Sawyer College in New Hampshire from Jul. 26-Jul. 31, 2009—poster presentation by Benjamin Dach from Columbia University.

American Chemical Society, Division of Colloid and surface Chemistry Abstracts, 226th ACS National Meeting, New York, NY, Sep. 7-11, 2003, 61 pages.

Billes, F.,et al., "Vibrational spectroscopy of triazoles and tetrazole," J. Mol. Struct. 2000, vol. 530, p. 183-200.

Collman et al., ""Clicking" Functionality onto Electrode Surfaces," Langmuir vol. 20, pp. 1051-1053 (2004).

Cushing et al., "Recent Advances in the Liquid-Phase Syntheses of Inorganic Nanoparticles," Chem Rev., vol. 104, pp. 3893-3946 (2004).

Fleming et al., "Triazole Cycloaddition as a General Route for Functionalization of Au Nanoparticles," Chem matter, vol. 18, pp. 2327-2334 (2006).

Heylin, M., et al., "Chemistry Grads Post Gains in 2005", 2006, C&EN, pp. 43-52.

Himo et al., "Copper(I)-Catalyzed Synthesis of Azoles. DFT Study Predicts Unprecedented Reactivity and Intermediates," J. Am. Chem. Soc., vol. 127, pp. 210-216 (2005).

Hofer et al., "Alkyl Phosphate Monolayers, Self-assembled from Aqueous Solution onto Metal Oxide Surfaces," Langmuir 2001, vol. 17, pp. 4014-4020.

Huber, "Synthesis, properties, and applications of iron Nanoparticles," Small, vol. 1, pp. 482-501 (2005).

Huh et al., "In Vivo Magnetic Resonance detection of Cancer by using Multifunctional magnetic nanocrystals," J. Am. Chem. Soc, vol. 127, pp. 12387-12391 (2005).

Huisgen R., "Kinetics and mechanism of 1,3-Dipolar Cycloadditions," Angewandte Chemie, International Edition, vol. 2, pp. 633-645 (Nov. 1963).

Koh et al., "Functionalization of nanoparticles for Biological Applications," Dissertation (2005), 200 pages.

Kreller et al., "Chemical Force Microscopy investigation of phosphate adsorption on the surfaces of iron (III) Oxyhydroxide Particles," J. Colloid and Interface Science 2002, 205-213.

Kreller et al., "Competitive adsorption of phosphate and carboxylate with antural organic matter on hydrous iron oxides as investigated by chemical force microscopy," Colloids and Surfaces A: Physicochemical and Engineering Aspects vol. 211 (2003), pp. 249-264.

Kurikka, V.P.M., et al., "Sonochemical Synthesis of Functionalized Amorphous Iron Oxide Nanoparticles", 2001, Langmuir, 17, pp. 5093-5097.

Lewis et al., "Click Chemistry in Situ: Acetylcholinesterase as a Reaction Vessel for the selective Assembly of a Femtomolar Inhibitor from an Array of Building Blocks," Angrew. Chem. Int., vol. 41, pp. 1053-1057 (2002).

Li et al., "Functionalization of Single-Walled Carbonnanotubes with Well-Defined Polystyrene by "Click" Coupling," J. Am. Chem. Soc., vol. 127, pp. 14518-14524 (2005).

Lu et al., "Click Chemistry Functionalized Polymeric Nanoparticles Target Corneal Epithelial Cells through RGD-Cell Surface Receptors," Bioconjugate Chem., vol. 20(1) pp. 87-94 (2009).

Lu et al., "Magnetic nanoparticles: Synthesis, protection, functionalization, and application," Angwandte Chemie-international Edition, vol. 46, Issue 8, pp. 1222-1244 (2007).

Lummerstorfer et al., "Click Chemistry on surface: 1,3-Dipolar Cycloaddition reactions of Azide-terminated monolayers on Silica," J. Phys. Chem. B, vol. 108, (2004), pp. 3963-3966.

Maliakal, et al., "Inorganic Oxide Core, Polymer Shell Nanocomposite as a High K Gate Dielectric for Flexible Electronics Applicaitons," J. Am. Chem. Soc. 2005, vol. 127, p. 14655-14662.

Martin, S.,m et al., "Surface Structures of 4-Chlorocatecol Adsorbed on Titanium Dioxide", 1996, Environ. Sci. Technol., 30, pp. 2535-2542.

Masala et al., "Synthesis routes for large volumes of nanoparticles," Annual Review of Materials Research vol. 34, pp. 41-81 (Aug. 2004).

Matsuno et al., "Polystyrene-and Poly(3-vinylpyridine)-Grafted magnetite nanoparticles prepared through surface-initiated nitroxide-mediated radical polymerization," Macromolecules, vol. 37 (2004), pp. 2203-2209.

Mutin et al., "Hybrid materials from organophosphorus coupling molecules," J. Materials Chemistry, vol. 15 (2005), pp. 3761-3768.

Noodleman et al., "Quantum Chemical Studies of Intermediates and Reaction Pathways in Selected Enzymes and catalytic Synthesis System," Chem Rev., vol. 104, pp. 459-508 (2004).

Pellegrino et al., "On the development of Colloidal Nanoparticles towards multifunctional structures and their possible use for biological applications," Small vol. 1, pp. 48-63 (2005).

Punna et al., "Head-to-tail peptide Cyclodimerization by Copper-Catalyzed Azide-Alkyne Cycloaddition," Angew Chem. Int., vol. 44, pp. 2215-2220 (2005).

Ramakrishna et al., "Interfacial Electron Transfer between the Photoexcited Porphyrin Molecule and Tio2 Nanoparticles: Effect of Catecholate binding," J. Phys. Chem., vol. 110, pp. 9012-9021 (2006).

Rodionov et al., Mechanism of the Ligand-Free Cu1-Catalyzed Azide-Alkalyne Cycloaddittion Reaction, Angewandte Chemie Int., vol. 44, pp. 2210-2215 (2005).

Sahoo et al., "Alkyl Phosphonate/Phosphate Coating on magnetite Nanoparticles: A comparision with Fatty Acids," Langmuir vol. 17(2001), pp. 7907-7911.

Shon Y.S., "Metal Nanoparticles Protected with Monolayers: Synthetic Methods," Dekker Encyclopedia of nanoscience and Nanotechnology, pp. 1-11 (2004).

Song et al., " Comparison of 0ne-, two- , and three-dimensional iron phosphates containing ethylenediamine," J. Solid State Chem., vol. 175, pp. 63-71(2003).

Song et al., "Surface modulation of magnetic nanocrystals in the development of highly efficint magnetic resonance probes for intrecellular labelling," J. Am. Chem. Soc, vol. 127 (2005), pp. 9992-9993.

(56) References Cited

OTHER PUBLICATIONS

Sun et al., "Carbohydrate and protein Immobilization onto Solid Surface by Sequential Diels—alder and Azide- Alkyne Cycloadditions," Bioconjugate Chem, vol. 17, pp. 52-57 (2006).

Verevkin, G.V., et al., "A study of certain complex compounds of iron with the aid of magnetic measurements and the method of nuclear y-resonance", 1999, Russian Chemical Bulletin, 19, p. 2566-2569.

Vioux et al, "Hybrid Organic-Inorganic Materials Based on Organophosphorus Derivatives.", Top. Curr. Chem. vol. 232, p. 145-174 (2004).

Wang et al., "A Biocompatible Method pf Decorporation: Bisphonate-modified Magnetite Nanoparticles to remove Uranyl Ions from Blood," J. Am. Chem. Soc., vol. 128(41), pp. 13358-13359 (Oct. 2006).

Watson et al., "Electron injection at Dye-sensitized semiconductor electrodes," Annual Review of Physical Chemistry, vol. 56, pp. 119-156 (May 2005).

White et al., ""Click" Dielectrics Use of 1,3-Dipolar Cycloadditions to generate Diverse Core-Shell Nanoparticle Structures with Applications to flexible Electronics," Macromolecular Rapid Communications, vol. 29, Issue 18, pp. 1544-1548 (2008).

White et al., "Toward the syntheses of universal Ligands for Metal Oxide Surfaces: Controlling Surface Functionality through Click Chemistry," J.AM. Chem. Soc., vol. 128(35), pp. 11356-11357 (2006).

Willis, A.L., et al.,"Spectroscopic Characterization of the Surface of iron Oxyde Nanocrystals,", Chem Mater. 2005, vol. 17, p. 5970-5975.

Xu et al., Inorganic nanoparticles as carriers for efficient cellular delivery, Chem. Engineering Science 2006, 1027-1040.

Yee, C., et al., "Self-Assembled Monolayers of Alkanesulfonic and -phosphonic acids on Amorphous Iron Oxide Nanoparticles", 1999, Langmuir, 15, pp. 7111-7115.

\* cited by examiner

Table 1. Atomic Percentages for phthalimide SAM and Sample Determined from Fitting of XP Spectra

| Peak | Phthalimide SAM | Sample |
|---|---|---|
| C 1s | 47.86 | 49.46 |
| O 1s | 36.32 | 39.66 |
| Si 2p3 | 15.83 | 10.88 |
| C/Si | 3.02 | 4.55 |

FIG. 10

MODIFICATION OF SURFACES WITH NANOPARTICLES

CROSS-REFERENCE(S) TO RELATED APPLICATIONS

The present application claims the benefit of U.S. Patent Application No. 61/228,882, filed on Jul. 27, 2009, the content of which is hereby incorporated by reference herein in its entirety.

STATEMENT REGARDING FEDERALLY SPONSORED RESEARCH OR DEVELOPMENT

This invention was made with United States government support under Grant No. DGE-0221580 and DMR-0704054 awarded by NSF-IGERT and under CHE04-15516 and CHE07-17518 awarded by NSF. The United States government has certain rights in this invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

Certain embodiments of the invention relate to modifying and functionalizing surfaces with nanoparticles. For example, certain embodiments of the invention relate to methods for modifying organic or inorganic surfaces to graft nanoparticles on desired portions of the surface.

BACKGROUND

The properties of surfaces are known to be important to a broad spectrum of technologies, such as improved wear resistance, water-repellant fabrics, anti-reflective coatings, packaging materials, biomedical implants and prostheses, and the like. Many efforts have focused on controlling and improving upon existing surfaces.

Recently, there has been significant interest in properties of nanometer sized materials because the large surface to volume ratio in the nanometer size scale can lead to unexpected properties. However, techniques for modifying surfaces with nanometers sized material (i.e., nanoparticles) are not well-developed.

SUMMARY

Methods for functionalizing a surface of a substrate with nanoparticles are described.

In certain embodiments, the method can include attaching a plurality of photoactive linker to nanoparticles to obtain photoactive nanoparticles, wherein each photoactive linker comprises a binding group that attaches to the nanoparticles and a photoactive group; depositing the photoactive nanoparticles to the surface of the substrate, wherein the surface of the substrate comprises reactive groups that are capable of reacting with the photoactive groups; and irradiating the photoactive nanoparticles with radiation to react the photoactive group with the reactive group and to functionalize the surface of the substrate with nanoparticles. Optionally, the method can further include depositing additional photoactive nanoparticles after depositing the photoactive nanoparticles to the surface of the substrate.

In certain embodiments, the method can include attaching a plurality of photoactive linker to a surface of a substrate to obtain a photoactive surface, wherein each photoactive linker comprises a photoactive group and a binding group that attaches to the surface of the substrate; depositing nanoparticles to the photoactive surface, wherein the nanoparticles comprise reactive groups that are capable of reacting with the photoactive groups; and irradiating the photoactive surface with radiation to react the photoactive group with the reactive group to functionalize the surface of the substrate with nanoparticles. Optionally, the method can further include attaching a plurality of a second photoactive linker to nanoparticles to obtain photoactive nanoparticles, wherein each of the second photoactive linker can include a binding group that attaches to the nanoparticles and a second photoactive group; and depositing the photoactive nanoparticles to the substrate, wherein the second photoactive linker can be the same or different from the photoactive linker attached to the surface.

In certain embodiments, the method can further include applying a mask having a pre-selected pattern to the surface of the substrate prior to said irradiating.

In certain embodiments, the nanoparticles can be selected from the group consisting of metal oxide nanoparticles, gold nanoparticles, quantum dots, magnetic nanoparticles, photonic nanoparticles, and drug delivery nanoparticles.

In certain embodiments, the nanoparticles can have at least one dimension of about 10 to about 100 nm.

In certain embodiments, the photoactive linker can further include a spacer.

In certain embodiments, the photoactive groups can be selected from the group consisting of phthalimide, benzophenone, phenyl azide, xanthone, thioxanthone, sulfonyl azides, phenyl diazirine, and combinations thereof.

In certain embodiments, the substrate can include any organic material comprising hydrogen bonds (e.g., C—H, N—H, and S—H bonds).

In certain embodiments, the ligands or coatings on the nanoparticles can contain hydrogen bonds (e.g., C—H, N—H, and S—H bonds).

In certain embodiments, the irradiating step can react the photoactive groups to the hydrogen-containing reactive groups on the counterpart nanoparticle or substrate.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

Certain embodiments of the present invention provide modifying the surfaces of organic or inorganic substrates with nanoparticles. The surface can selectively be modified with nanoparticles at desired locations. The technique utilizes a photoactive linker bound to the nanoparticle or on the surface of the substrate, which can then be activated upon irradiation to react with hydrogen-containing reactive groups on the surface of the substrate or the nanoparticles, respectively, to obtain nanoparticles attached to the substrate surface.

As described above, the photoactive linker can be located on the nanoparticle itself or on the surface of the substrate. Accordingly, two approaches to modifying surface of a substrate with nanoparticles can be described—(1) a "grafting-to" approach where the photoactive linkers are on the nanoparticles and (2) a "grafting-from" approach where the photoactive linkers are on the surface of the substrate.

Grafting-To Approach

Figure 1:
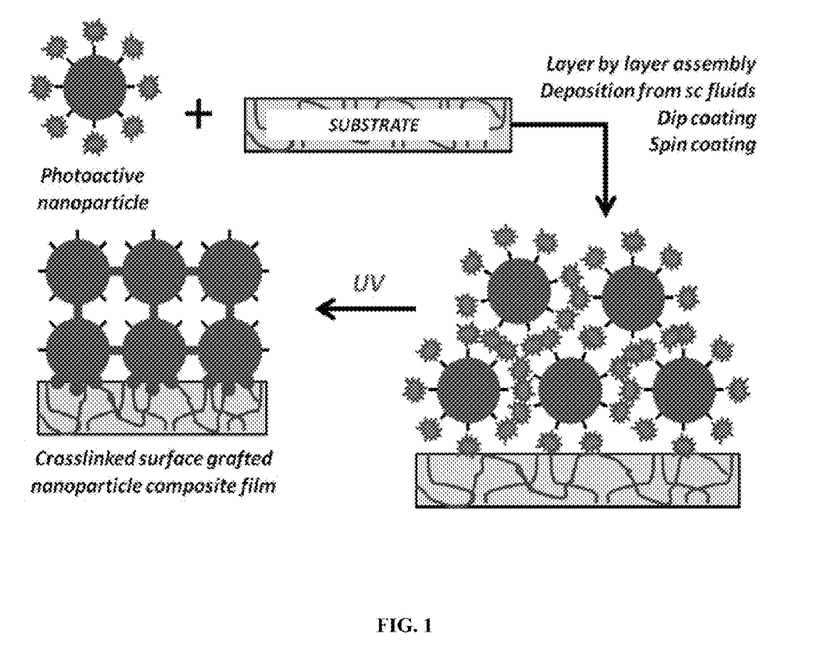
FIG. 1 is a schematic diagram of a grafting-to approach for modifying surface with nanoparticles in accordance with certain embodiments.

FIG. 1 shows the "grafting-to" approach wherein nanoparticles are provided with photoactive linkers that contain photoactive groups. The nanoparticles can be provided with photoactive linkers through exchange reactions with functional ligands and polymers and the like to obtain photoactive nanoparticles. In carrying out the reactions, suitable nanoparticle, photoactive linkers, solvent, solution concentration, and the like can be varied as would be apparent to one of ordinary skill in the art.

The photoactive nanoparticle can be applied onto a surface of a substrate, such as an organic or inorganic substrate. For example, the photoactive nanoparticles can be applied onto the substrate surface through spin-coating, solution casting, spray coating, and the like.

FIG. 1 shows that multiple layers of the nanoparticles can be deposited, although a monolayer of nanoparticles can also be deposited.

Subsequently or concurrent to the application of the nanoparticles onto the substrate surface, the photoactive groups can be activated (e.g., UV) by irradiation leading to reaction of the photoactive linkers on the nanoparticles with the hydrogen-containing reactive groups on the surface of the substrate. In certain embodiments, the photoactive linkers can react with each other to obtain a crosslinked network of nanoparticles on the surface of the substrate.

Grafting-From Approach

Figure 2:
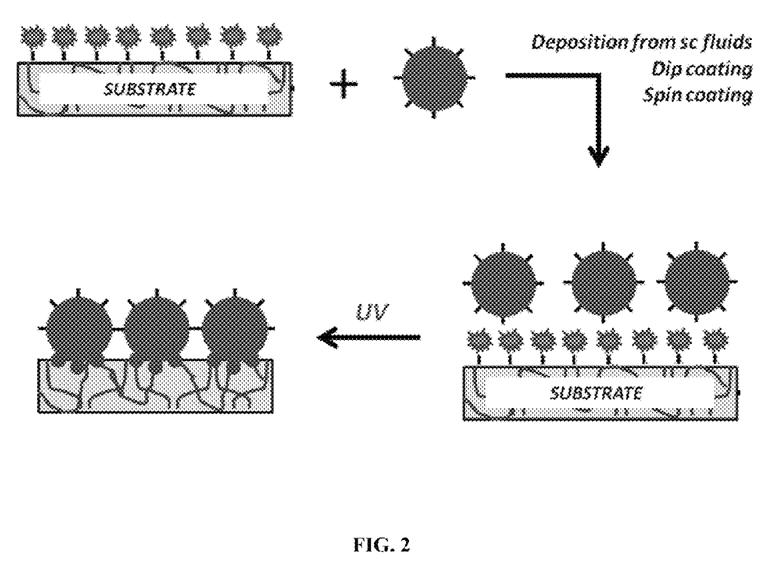
FIG. 2 is a schematic diagram of a grafting-from approach for modifying surface with nanoparticles in accordance with certain embodiments.

FIG. 2 shows an alternative "grafting-from" approach, where the photoactive linkers are provided on a substrate surface (e.g., phthalimide compound self-assembled onto the hard substrate, such as glass, silicon, gold). In certain embodiments, the photoactive linkers can be provided onto the surface as a self-assembled monolayer, as a thick layer of material, a deposited coating, and the like. The photoactive linker can be provided onto the surface through any suitable method, including solution deposition, melt deposition, ligand exchange, and the like. After attachment of the photoactive linkers on the substrate surface, the substrate surface can be considered a photoactive surface.

Thereafter, nanoparticles having groups that react with the photoactive groups (i.e., reactive groups) are provided onto the photoactive surface. In certain embodiments, the nanoparticles can already contain the hydrogen-containing reactive groups on the surfaces of the nanoparticles (e.g., polymeric nanoparticles where the polymer contains C—H, N—H, or S—H bonds subject to hydrogen abstraction by the photoactive moieties). Alternatively, the nanoparticles can be provided with reactive groups (e.g., C—H, N—H, or S—H bonds) through ligand exchange, solution deposition, and the like.

Subsequently or concurrent to the application of the nanoparticles onto the substrate surface, the photoactive groups can be activated (e.g., UV) by irradiation leading to reaction of the photoactive groups on the surface of the substrate with the activated reactive groups on the nanoparticles.

It should be noted that the "grafting-to" and the "grafting-from" techniques can be combined as desired. For example, the "grafting-from" approach can be followed by the "grafting-to" approach so that multiple layers of nanoparticles are bound to the surface.

Moreover, additional steps can be carried out. For example, because the photoactive linkers become reactive only in areas the techniques described herein can further utilize photolithographic techniques, where only the pre-selected desired portions of the substrate surface can be irradiated. Accordingly, only the exposed areas will become reactive and only the exposed areas will have nanoparticles bound to the substrate surface.

In certain embodiments, the grafting from approach can also be used to create functional surfaces or patterned functional surfaces by use of a nanoparticle decorated with ligands or polymers that present a terminal functional group of a second type that does not react preferentially with the photoactive moiety. In this case, the nanoparticle can be grafted to the surface by reaction between the photoactive group and the functional group of the first type (e.g., C—H, N—H, or S—H groups) on the ligands or polymer brushes leading to functionalization of the surface with the functional group of the second type. The functional groups can be patterned by light exposure through a mask after which only the exposed areas will become reactive and only the exposed areas will have nanoparticles bound to the substrate surface In some other embodiments, the grafting from approach can be employed to graft polymeric nanoparticles without the need for ligands or surface decoration of the nanoparticle with polymers. In this case, the nanoparticle can comprise material with appropriate functional groups containing hydrogens (e.g., C—H, N—H, or S—H groups) capable of reaction with the photoactive moieties.

The techniques described herein are not limited to nanoparticles; it can be used to graft any type of particulate matter or any size that comprises appropriate hydrogen-containing functional groups (e.g., C—H, N—H, or S—H groups) capable of reaction with the photoactive moieties.

Materials

Further description of the substrate, nanoparticle, and photoactive linker are described herein.

Surface of a Substrate

The surface of the substrate can be a surface of any material, including organic and inorganic materials.

Organic materials include any material that comprises carbon atoms. For example, organic materials include materials having C—H, N—H, S—H bonds or other functionality capable of reaction with the photochemical groups, such as a polymer and the like. Exemplary polymers include polystyrene, polymethacrylate (or any other members of the families of polyacrylates), polycarbonate, polyurethane, polyethylene oxide, polyesters, polyamides, polydienes, block copolymers thereof, and the like.

Inorganic materials include any non-carbon-containing materials. For example, inorganic materials include glass and other ceramics, noble metals including gold and silver, silicon and oxides thereof, and other metal oxides.

The surface of the substrate can be flat, round, curved, or any desired shape provided that shape does not preclude exposure of the photoactive linkers to irradiation so that photoactive groups can be activated.

In certain embodiments, the surface of the substrate includes or can be functionalized with hydrogen-containing reactive groups that can react with the photoactive groups on the photoactive linkers. For example, when employing a grafting-to approach and the photoactive linker is reactive with C—H bonds upon irradiation, the substrate can be a polymer having C—H bonds. Alternatively, the substrate can be an inorganic material (e.g., glass, gold, etc.) where a polymer has been coated thereon.

In certain embodiments, the surface of the substrate includes or can be functionalized with reactive groups that can react with the photoactive groups on the external species (e.g. nanoparticles).

In certain embodiments, the surface includes or can be functionalized with photoactive linkers. For example, when employing a grafting-from approach and the nanoparticle contains a polymer having C—H, N—H, or S—H bonds, the substrate can be any organic material containing phthalimide groups (or other photoactive groups discussed herein). Alternatively, the substrate can be an inorganic material (e.g., glass, gold, etc.) functionalized with a self-assembling molecule having photoactive groups (e.g., phthalimide, benzophenone, and the like). The substrate can also be any material that is decorated with ligands or polymers (including copolymers and block copolymers) that comprise photoactive groups.

Nanoparticles

The nanoparticle can be any desired nanoparticle, including organic and inorganic nanoparticles.

Exemplary organic nanoparticles include those made from hydrophilic polymers such as dextran as well as hydrophobic polymers such as polystyrene.

Exemplary inorganic nanoparticles include iron oxide, cerium oxide, gold, silica, barium and other titanates, titanium oxide, zinc oxide, and cadmium-selenide.

Other exemplary nanoparticles include quantum dots, magnetic nanoparticles, photonic nanoparticles, and drug delivery nanoparticles The nanoparticle can be spherical, rod-like, tripod-like, tetrapod-like, platelets, and any other desired shapes.

The nanoparticles can range in size of about 1 nm to about 10,000 nm. In certain embodiments, the nanoparticles range in size of about 10 nm to about 1,000 nm.

In certain embodiments, the nanoparticles can include or be functionalized with photoactive linkers that becomes activated upon exposure to photons and react with reactive groups that are on the surface of the substrate, as more fully described below.

In other embodiments, the nanoparticles can include or be functionalized with reactive species that can react with the photoactive linkers on the surface of the substrate that becomes activated upon exposure to photons, as more fully described below.

Photoactive Linkers

As used herein, a "photoactive linker" includes at least a photoactive group and a binding group.

The photoactive groups can become reactive upon exposure to photons (i.e., photoactive), such as UV or visible wavelengths.

In certain embodiments, photoactive groups include phthalimide, benzophenone, phenyl azide, xanthone, thioxanthone, sulfonyl azides, phenyl diazirine, and other photoactive groups.

The photoactive group can also be selected so that the excitation wavelength utilized to activate the photoactive group is selected to optimize favorable interactions with the nanoparticles and/or the surface.

In certain embodiments, the photoactive group can also be selected so that the excitation wavelength utilized to activate the photoactive group is selected to minimize unfavorable interactions with the nanoparticles and/or the surface. For example, the photoactive group can be activated at excitation wavelengths which do not lead to crosslinking or degradation of the nanoparticles and/or the surface.

As described above, upon irradiation, the photoactive groups can react with reactive groups that are present on the surface of the substrate or the nanoparticles.

In certain embodiments, the photoactive linker further includes a binding group that binds to the nanoparticle or the surface to be functionalized. Such a binding group can include carboxylates, alcohols, phosphonates, phosphonic acid esters, silanes, siloxanes, enediols, diols, catechols, thiols, and the like. For example, trimethoxysilane binding group can be used to bind to silica nanoparticles or silica surface. Thiol binding groups can be used to bind to gold nanoparticles or gold surface. In certain embodiment, the binding group may have additional protecting groups (e.g., trimethoxysilanes, etc.)

In certain embodiments, the photoactive linker may further include one or more spacers that provide desired length. The spacer may additional provide desired placement of the binding group and photoactive group on the photoactive linker. For example, the spacer can include alkanes, alkane esters, alkane ethers, and even oligomers and polymers, such as oligomeric and polymeric forms of ethylene glycol, polyacetylenes, polyphenylenes, and the like.

Generally, the spacer can have approximately 1-20 carbon atoms, such as $C_{1-20}$ alkanes, alkane esters, alkane ethers, or ethylene glycol having 1-20 repeat units. In certain embodiments, the spacer can provide a suitable length between the photoactive group and a binding group so that the photoactive linker can form a self-assembled monolayer when deposited on the surface or the nanoparticle.

In addition, the spacer can be selected so that the presence of the spacer does not detrimentally affect exposure of the photoactive group to irradiation. In certain instances, the spacer can be transparent to radiation wavelengths utilized to activate the photoactive group.

In certain embodiments, the spacer can include reactive groups that are present on the surface of the substrate or the nanoparticles. Exemplary reactive groups include hydrogen atoms (e.g., C—H, N—H, and S—H bonds) and the like.

A photoactive linker is not necessarily limited to a single molecule. Rather, a photoactive linker can be attached to the nanoparticle or the surface through multi-step reactions. For example, a bifunctional molecule having at least a binding group and a functional group (e.g., a click chemistry functional group) can be attached to the nanoparticle or the surface. Subsequently, a second molecule (e.g., oligomer, polymer, surfactant, etc.) having the photoactive group and a complementary click chemistry functional group can be attached thereto. In this manner, the photoactive linker having a binding group and a photoactive group can be attached to the nanoparticle or the surface in multiple steps. Exemplary click chemistry functional groups include alkyne, trimethylsilyl-protected alkyne, azide, nitrile, thiol, alkene, maleimide, epoxide, nucleophile, thiiranium, and the like.

Advantages

There are several advantages to the present invention that is not achieved with conventional techniques.

First, a wide range of different surfaces can be functionalized with a wide range of different nanoparticles by selection of the desired materials and the requisite chemistry. For example, the invention provides techniques to functionalize hard substrates, such as glass, gold, and the like. The invention further provides techniques to functionalize soft substrates, such as polymers and the like.

Second, the surfaces can be selectively patterned with nanoparticles using lithographic techniques as the photoactive groups can be selectively activated through use of appropriate masking techniques.

Third, the resulting layer of nanoparticles can be applied at any desired thickness, including a monolayer of nanoparticles to multiple layers of nanoparticles depending on the desired application. In the case of multilayers, the layers can be crosslinked to each other.

Fourth, the resulting layer of nanoparticles can provide any number of desired and improved properties, such as scratch resistance, tear resistance, fracture resistance, improved mechanical stability, chemical resistance, superhydrophobicity, superhydrophilicity, antistatic coatings, and the like.

Fifth, compared to traditional coatings on surfaces, the nanoparticles can be coated onto the surface so that the photoactive linker provide desired properties in conjunction with the nanoparticles and more facile tailoring of the desired properties is possible. For example, by providing polymeric spacers that are similar to the surface to be functionalized, thermal or mechanical mismatch can be minimized providing improved performance.

Sixth, the density of the nanoparticles on the surface can be controlled by the appropriate selection of nanoparticles and the photoactive linker.

EXAMPLES

Example 1

Grafting-To Approach

Figure 3:
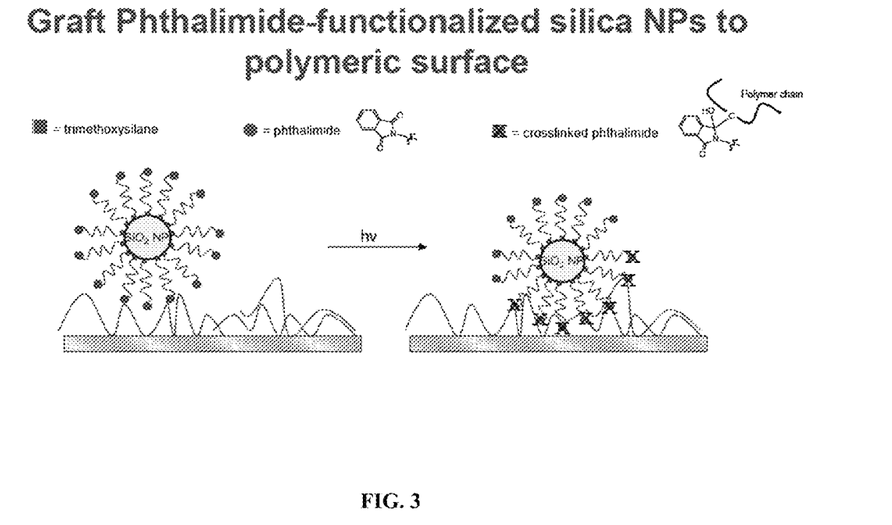
FIG. 3 is a schematic diagram of a grafting-to approach using photoactive linker having a phthalimide photoactive group and trimethoxysilane binding group in accordance with certain embodiments.

For the grafting-to approach, nanoparticles functionalized with photoactive linkers (e.g., phthalimide-functionalized nanoparticles) are spin-coated onto the polymeric substrate (e.g., polystyrene) and reaction can be initiated (e.g., exposed to 300 nm light for 15 minutes). After the particles are grafted to the substrate, a rinsing procedure can be carried out (e.g., with ethanol and water). Such a grafting-to approach is schematically illustrated in FIG. 3. As shown therein, phthalimide-functionalized silica nanoparticles are grafted onto polymeric substrate.

First, nanoparticles (e.g., silica nanoparticles) can be functionalized with phthalimide as follows.

Phthalimide-undecane-trimethoxysilane was first synthesized from bromoundecane-trimethoxysilane (provided by Gelest, Inc.) by adding potassium phthalimide to the mixture and stirring overnight in DMF. This compound was characterized by Nuclear magnetic resonance (NMR) and Mass spectroscopy (MS).

Phthalimide-undecane-trimethoxysilane was then added to fumed silica in toluene and stirred at 80 deg C. overnight.

Figure 4:
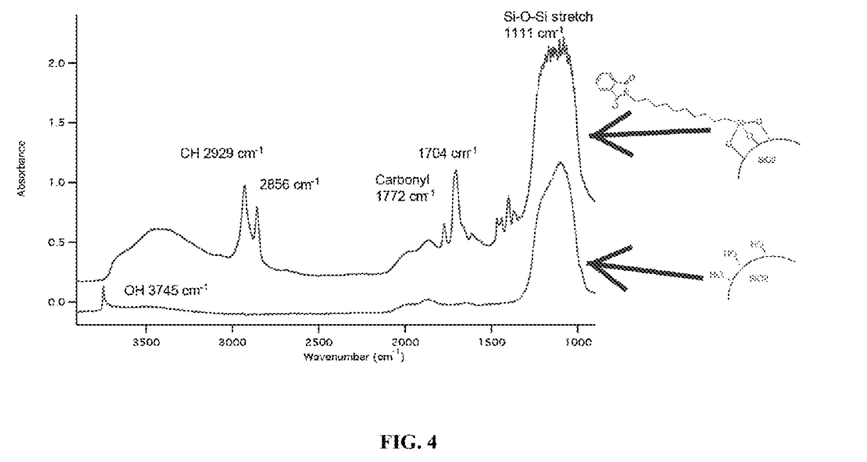
FIG. 4 shows Fourier Transform Infrared (FTIR) spectra of silica nanoparticles before and after photoactive linker having a phthalimide photoactive group and trimethoxysilane binding group have been attached to the silica nanoparticle in accordance with certain embodiments.
Figure 5:
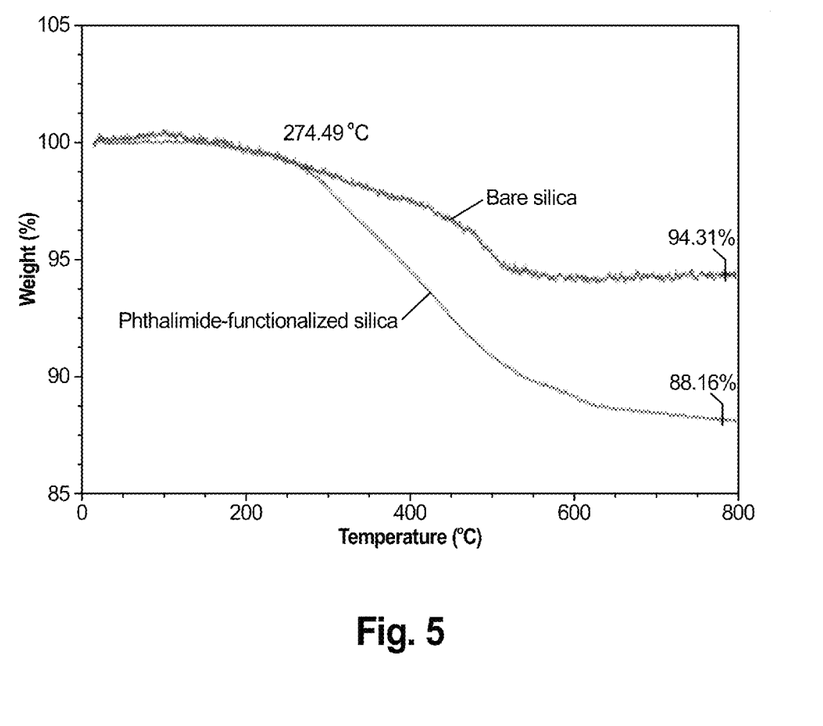
FIG. 5 shows thermogravimetric measurement of silica nanoparticles with and without photoactive linker having a phthalimide photoactive group and trimethoxysilane binding group in accordance with certain embodiments.

The phthalimide-functionalized fumed silica was purified via centrifugation. The reaction mixture was centrifuged at 3000 rpm for 30 min each time, for three cycles. Phthalimide functionalized fumed silica was characterized with Fourier-Transform Infrared Spectroscopy (FTIR) (FIG. 4) and Thermogravimetric Analysis (TGA) (FIG. 5). These results indicate that the silica was functionalized with phthalimide. For example, the FTIR spectra in FIG. 4 show additional peaks that correspond to the phthalimide and the TGA result in FIG. 5 shows a greater percentage weight loss for phthalimide-fumed silica indicating the loss of the self-assembled phthalimide compound on silica particles.

Then, the phthalimide-functionalized nanoparticles can be grafted onto a substrate (e.g., polymeric substrate) as follows (e.g., using photons).

Figure 6:
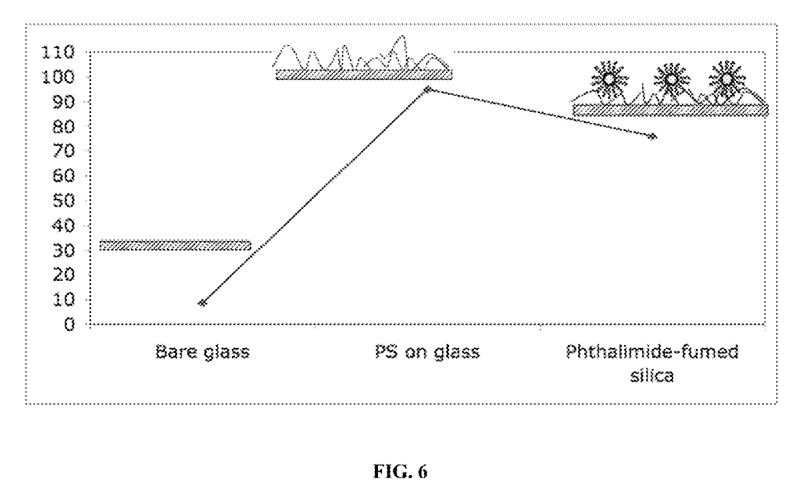
FIG. 6 shows contact angle measurements of bare glass, glass with polystyrene, and with silica nanoparticles bound to the polystyrene in accordance with certain embodiments.
Figure 7A:
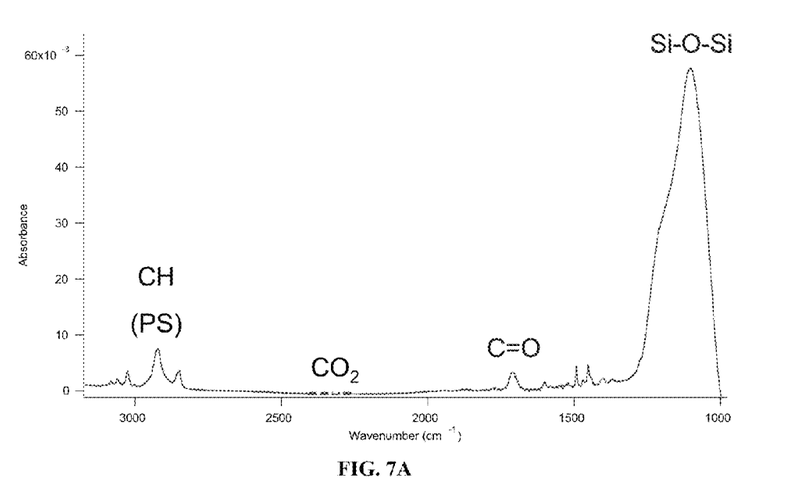
FIGS. 7A and 7B show a Fourier-Transform Infrared spectrum of a polystyrene film with photo-grafted phthalimide-functionalized silica particles and a decreasing trend of the phthalimide carbonyl absorbance with respect to UV irradiation time in accordance with certain embodiments.
Figure 7B:
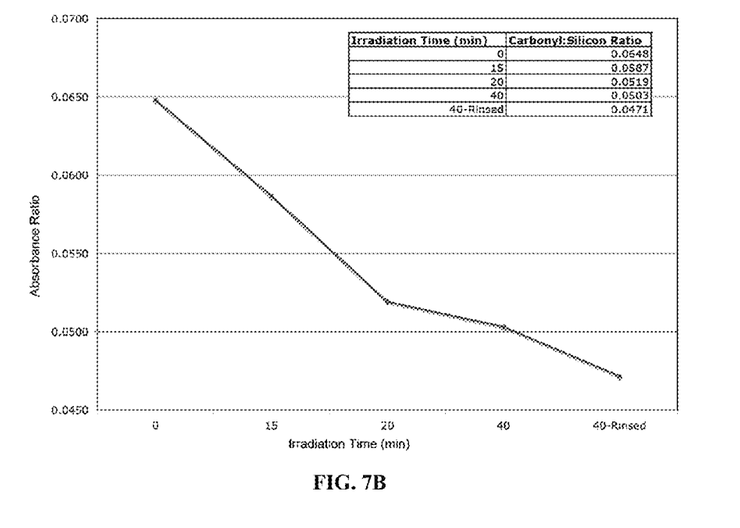

Phthalimide-functionalized silica dissolved in toluene was spin-coated onto polystyrene substrate. Then, the surface was irradiated with 300 nm light for 15 minutes. The surfaces were characterized by contact angle goniometry (FIG. 6), Fourier Transform Infrared (FTIR)-transmission spectroscopy (FIG. 7) and scanning electron microscopy. As shown in FIG. 6, change in the contact angle before and after the functionalized nanoparticles have been grafted onto the substrate indicates the presence of phthalimide-silica.

Polystyrene substrates with photografted phthalimide-functionalized silica were analyzed with Fourier Transform Infrared (FTIR)-transmission spectroscopy with respect to UV irradiation time (FIG. 7). As the UV exposure time of the phthalimide-functionalized silica particles increased, the absorbance intensity of the phthalimide's carbonyl group on the particles decreased, presumably through a hydrogen abstraction mechanism. The calculated ratios were the FTIR absorbance intensity of the carbonyl from the phthalimide group compared to that of the silane end group of these ligands on the particles.

Example 2

Grafting-From Approach

Figure 8:
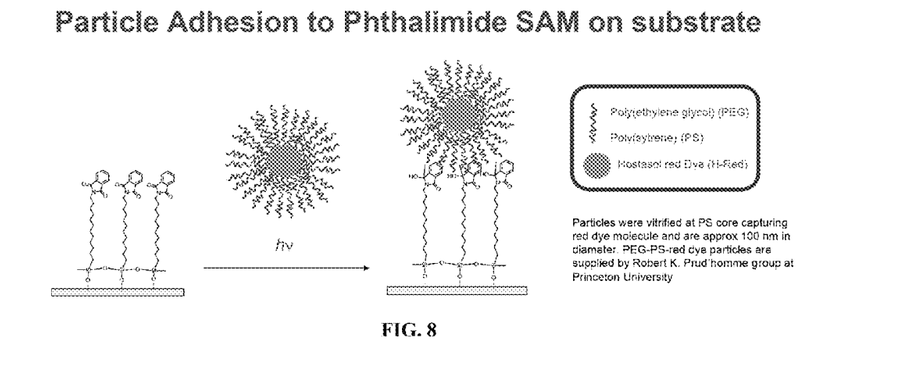
FIG. 8 is a schematic diagram of a grafting-from approach using a photoactive linker having a phthalimide photoactive group with a polymeric nanoparticle having a red dye in accordance with certain embodiments.

For the grafting from approach, the nanoparticles (e.g., polymeric nanoparticles) can be applied (e.g., spin-coated)

onto a substrate surface functionalized with photoactive linkers (e.g., phthalimide self-assembled monolayer on a hard substrate such as gold or glass). After the particles are applied to a functionalized surface, reaction can be initiated (e.g., exposed to 300 nm light for 15 minutes). After the particles are grafted to the substrate, a rinsing procedure can be carried out (e.g., with ethanol and water, and depending on grafting analyte). Such a grafting-from approach is schematically illustrated in FIG. 8. As shown therein, polymeric nanoparticles are grafted on phthalimide-functionalized hard substrate.

Solution of phthalimide-undecane-trimethoxysilane (1 mM) in toluene was prepared. Piranha-cleaned glass or silicon wafers were immersed into the self-assembled monolayer (SAM) solution for self-assembly overnight at room temperature in the dark. The phthalimide-SAM-functionalized surfaces were characterized by contact angle goniometry, x-ray photoelectron spectroscopy.

Solution of polymeric nanoparticles was spin-coated onto the phthalimide-modified surfaces and exposed to UV light at 300 nm for 15 minutes. The particles were vitrified at the polystyrene core by capturing the red dye molecule and are approximately 100 nm in diameter. The particles have a morphology of polyethylene glycol (PEG)-polystyrene (PS)-red dye from the outer shell to the core of the particle. These particle-grafted surfaces were characterized by contact angle goniometry, fluorescence spectroscopy (FIGS. 9A and 9B), and x-ray photoelectron spectroscopy (FIG. 10).

Figure 9A:
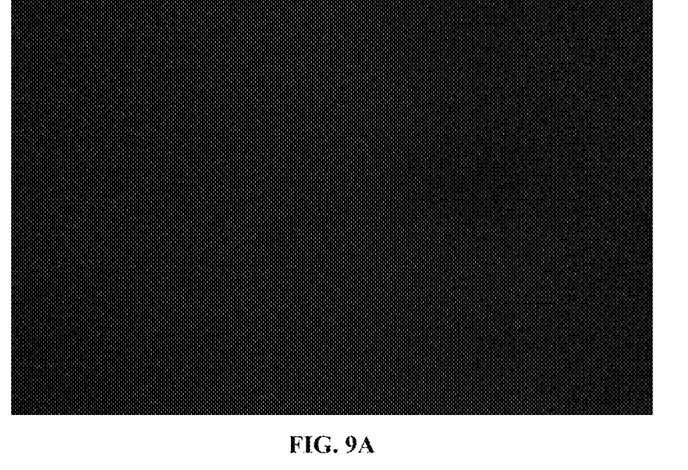
FIGS. 9A and 9B show confocal fluorescence images of phthalimide self assembled monolayer (FIG. 9A) and PEG-PS-Hostasol Red-20% alkyne particles photopatterned onto phthalimide-functionalized glass substrates (FIG. 9B) in accordance with certain embodiments.
Figure 9B:
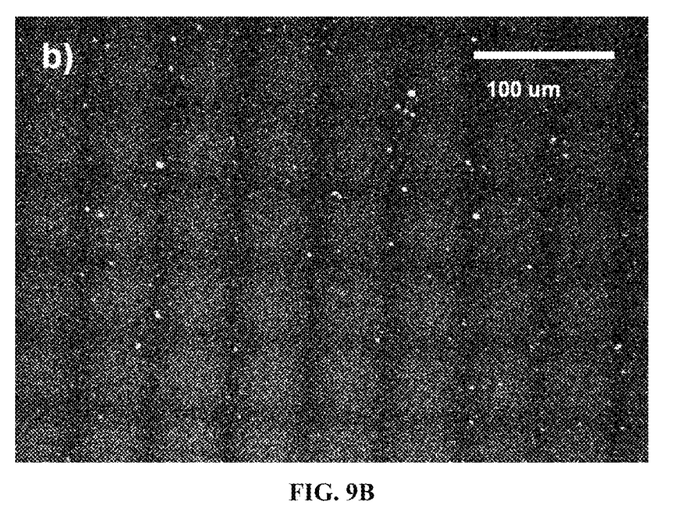

As shown in FIG. 9, Confocal Fluorescence Microscopy (CFM) images show that the polymeric particles, PEG-PS-Hostasol Red-20% alkyne particles, are photopatterned onto a phthalimide-functionalized glass surface. On the left, the CFM image of the phthalimide-functionalized surface shows a weaker fluorescence. On the right, the CFM image indicates the presence of the particles only in areas exposed to light (as indicated by brighter squares) and no particles along the borders of squares.

Figure 10:
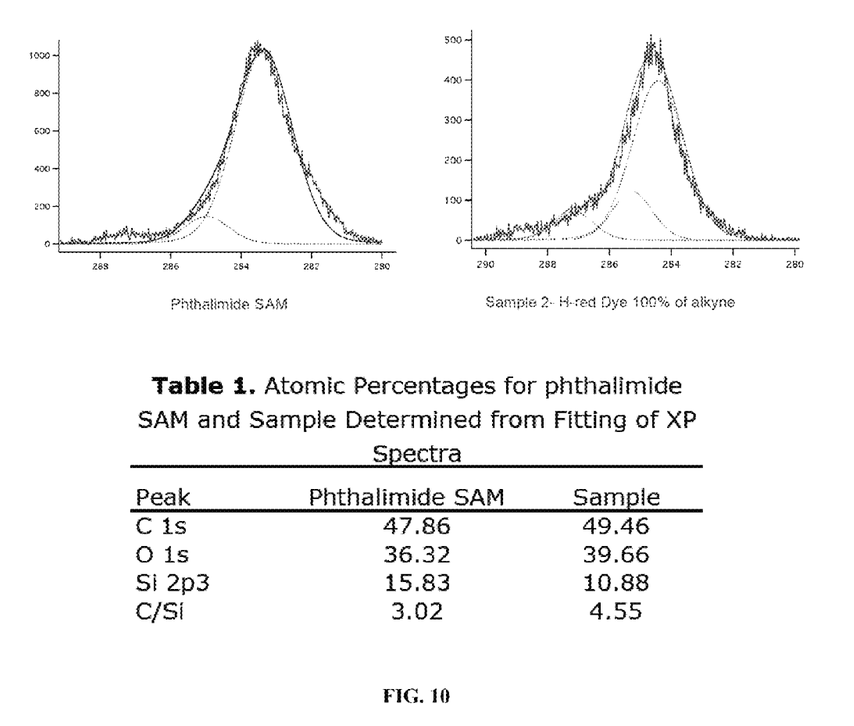
FIG. 10 shows x-ray photoelectron spectra of surface functionalized with a photoactive linker having phthalimide self-assembled monolayer (left) and the surface grafted with the polymeric particles (right) in accordance with certain embodiments.

FIG. 10 shows XPS spectra of a phthalimide-only-functionalized surface (left) and of a surface after the polymeric particles have been grafted (right). These peak were fitted with known peak emissions for various elements (e.g., ~285 eV for carbon 1s) and the ratio of C/Si is shown to increase when the polymeric particles have been grafted. Increase of C/Si ratio indicates the adhesion of polymeric nanoparticles, but a more sensitive fluorescence optical microscopy technique may provide complementary results to detect the presence of H-Red dye at the core of the polymeric particles.

Upon review of the description and embodiments of the invention described above, those skilled in the art will understand that modifications and equivalent substitutions may be performed in carrying out the invention without departing from the essence of the invention.

The invention claimed is:

1. A method for functionalizing a surface of a substrate with nanoparticles, the method comprising:
attaching a plurality of photoactive linker to nanoparticles to obtain photoactive nanoparticles, wherein each photoactive linker comprises a binding group that attaches to the nanoparticles and a photoactive group, wherein the photoactive group is selected from the group consisting of a phthalimide, benzophenone, xanthone, thioxanthone, phenyl diazirine and combinations thereof;
depositing the photoactive nanoparticles to the surface of the substrate, wherein the surface of the substrate comprises hydrogen-containing reactive groups; and
irradiating the photoactive nanoparticles with radiation to react the photoactive group with the hydrogen-containing reactive group and to functionalize the surface of the substrate with nanoparticles.

2. The method of claim 1, further comprising:
applying a mask having a pre-selected pattern to the surface of the substrate prior to said irradiating.

3. The method of claim 1, wherein the nanoparticles are selected from the group consisting of metal oxide nanoparticles, gold nanoparticles, quantum dots, magnetic nanoparticles, photonic nanoparticles, and drug delivery nanoparticles.

4. The method of claim 1, wherein the nanoparticles have at least one dimension of about 10 to about 100 nm.

5. The method of claim 1, wherein the photoactive linker further comprises a spacer.

6. The method of claim 1, wherein the substrate comprises an organic material comprising C—H bonds, N—H bonds, or S—H bonds.

7. The method of claim 1, wherein said photoactive linker comprises C—H bonds, N—H bonds, or S—H bonds.

8. The method of claim 7, wherein said photoactive groups of the photoactive linker react through the C—H bonds, N—H bonds, or S—H bonds upon said irradiating.

9. The method of claim 1, further comprising depositing additional photoactive nanoparticles after said depositing the photoactive nanoparticles to the surface of the substrate.

10. The method of claim 1, wherein the substrate comprises glass, silicon or gold.

11. The method of claim 10, wherein the substrate comprises glass.

12. A method to obtain a functionalized surface, the method comprising:
attaching a plurality of photoactive linkers to a plurality of nanoparticles to obtain photoactive nanoparticles, wherein each linker comprises a binding group that attaches to the nanoparticle and a photoactive group, and wherein the photoactive group comprises a phthalimide or benzophenone group;
depositing the photoactive nanoparticles to the surface of the substrate, wherein the surface of the substrate comprises hydrogen-containing reactive groups; and
irradiating the photoactive nanoparticles in the presence of a substrate having hydrogen-containing reactive groups such that the photoactive group reacts with the substrate, thereby forming a functionalized surface on the substrate.

13. The method of claim 12, further comprising applying a mask having a pre-selected pattern to the surface of the substrate prior to said irradiating.

14. The method of claim 12, wherein the nanoparticles are selected from the group consisting of metal oxide nanoparticles, gold nanoparticles, quantum dots, magnetic nanoparticles, photonic nanoparticles, and drug delivery nanoparticles.

15. The method of claim 12, wherein the nanoparticles have at least one dimension of about 10 to about 100 nm.

16. The method of claim 12, wherein the photoactive linker further comprises a spacer.

17. The method of claim 12, wherein the substrate comprises an organic material comprising C—H bonds, N—H bonds, or S—H bonds.

18. The method of claim 12, wherein the substrate comprises glass, silicon or gold.

19. The method of claim 18, wherein the substrate comprises glass.

20. The method of claim 12, further comprising depositing additional photoactive nanoparticles after said depositing the photoactive nanoparticles to the surface of the substrate.

21. A method for functionalizing a surface of a substrate with nanoparticles, the method comprising:
   attaching a plurality of photoactive linkers to a plurality of nanoparticles to obtain photoactive nanoparticles, wherein each linker comprises a binding group that attaches to the nanoparticle and a photoactive group, and wherein the nanoparticles are drug delivery nanoparticles;
   depositing the photoactive nanoparticles to the surface of the substrate, wherein the surface of the substrate comprises hydrogen-containing reactive groups; and
   irradiating the photoactive nanoparticles in the presence of a substrate having hydrogen-containing reactive groups such that the photoactive group reacts with the substrate, thereby forming a functionalized surface on the substrate.

22. The method of claim 21, further comprising applying a mask having a pre-selected pattern to the surface of the substrate prior to said irradiating.

23. The method of claim 21, wherein the nanoparticles have at least one dimension of about 10 to about 100 nm.

24. The method of claim 21, wherein the photoactive linker further comprises a spacer.

25. The method of claim 21, wherein the substrate comprises an organic material comprising C—H bonds, N—H bonds, or S—H bonds.

26. The method of claim 21, wherein said photoactive linker comprises C—H bonds, N—H bonds, or S—H bonds.

27. The method of claim 26, wherein said photoactive groups of the photoactive linker react through the C—H bonds, N—H bonds, or S—H bonds upon said irradiating.

28. The method of claim 21, further comprising depositing additional photoactive nanoparticles after said depositing the photoactive nanoparticles to the surface of the substrate.

29. The method of claim 21, wherein the substrate comprises glass, silicon or gold.

30. The method of claim 29, wherein the substrate comprises glass.

* * * * *